Figure 1:
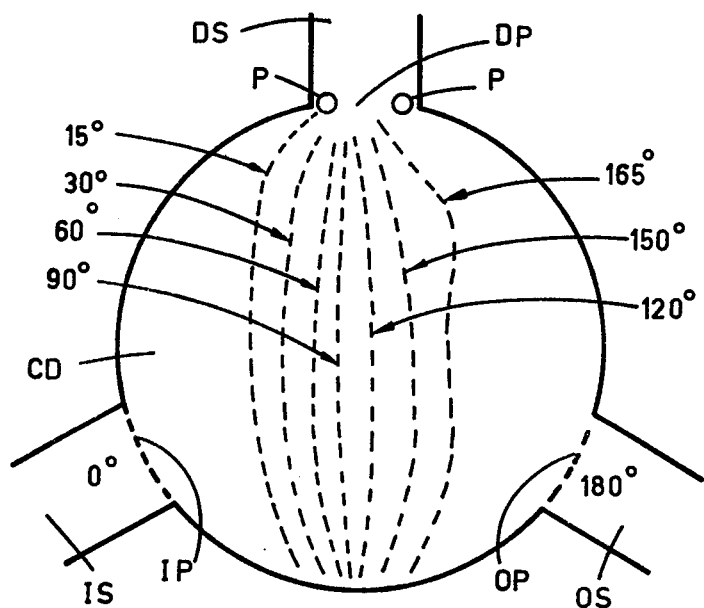

United States Patent [19]

Williams

[11] 4,195,296

[45] Mar. 25, 1980

[54] MICROWAVE CIRCULATOR

[75] Inventor: John C. Williams, Horley, England

[73] Assignee: U.S. Philips Corporation, New York, N.Y.

[21] Appl. No.: 886,133

[22] Filed: Mar. 13, 1978

[30] Foreign Application Priority Data

Mar. 14, 1977 [GB] United Kingdom ............... 10614/77

[51] Int. Cl.² .............................................. G01S 9/50
[52] U.S. Cl. ........................................ 343/8; 333/1.1; 333/246
[58] Field of Search ............................ 333/1.1; 331/9; 329/204; 343/5 PD, 8

[56] References Cited

U.S. PATENT DOCUMENTS

| | | | |
|---|---|---|---|
| 3,139,592 | 6/1964 | Sisson | 333/1.1 X |
| 3,448,822 | 6/1969 | La Lone et al. | 343/8 UX |
| 3,479,615 | 11/1969 | Garver | 333/1.1 X |
| 3,980,974 | 9/1976 | Yamamoto et al. | 333/98 R X |
| 4,034,313 | 7/1977 | Jones et al. | 333/1.1 X |
| 4,084,128 | 4/1978 | Ames et al. | 331/9 X |

*Primary Examiner*—Paul L. Gensler
*Attorney, Agent, or Firm*—Algy Tamoshunas

[57] ABSTRACT

A signal detection device for a Doppler radar system comprising a circulator having an input, an antenna and a detector port. The signal at the detector port comprises the echo signal received at the antenna port and a small portion of the signal to be transmitted applied at the input port, the latter having a phase which varies transversely across the detector port. The detection device further includes a pair of detectors each connected to one of two points transversely spaced across the detector port for producing output signal of a frequency corresponding to the Doppler frequency and different phase. The phase difference between the two output signals is indicative of the approach or recession of a target with respect to the radar system.

5 Claims, 6 Drawing Figures

Fig. 2.
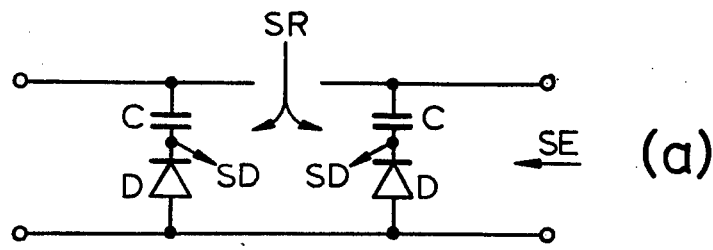 (a)
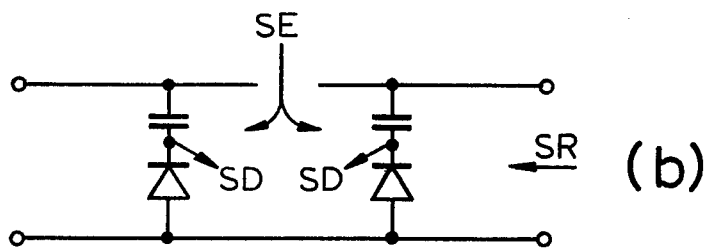 (b)
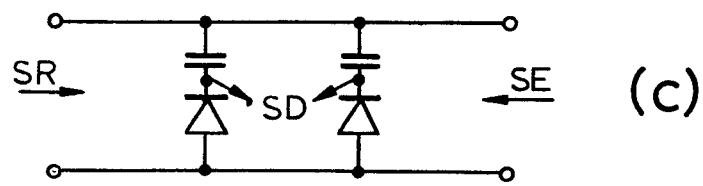 (c)
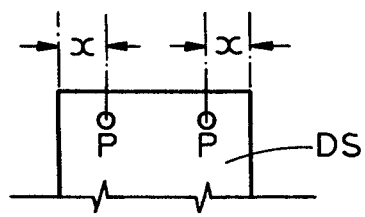
Fig. 6

MICROWAVE CIRCULATOR

This invention relates to microwave circulators and is concerned with three-port circulators suitable for Doppler radar equipment and of the kind comprising an input port into which transmitter signal power can be fed, an antenna port connectible to an antenna to supply transmitter power to the antenna and to receive echo signals derived from the antenna by reflection of transmitted power from a target and a detector port for connecting to a detector system of the equipment the echo signal transferred from the antenna port and also a small portion of the transmitter power transferred from the input port. Such circulators are well known and one example is described in U.K. Pat. No. 1,279,583.

Theories describing the operation of stripline circulators have been published by Bosma, IEEE Transactions (MTT) 1964 p. 61, using the solution of the field equations and the boundary value problem at the circulator disc to analyse circulator operation, and also by Skomal in IEEE Transactions (MTT) 1963 p. 117 and Ackers in "Microwave Journal" July 1967 p. 57 using the consideration of two counter-rotating surface waves and the consequent constructive and destructive interference effects. In both techniques the main aim has been to derive equations for disc diameters and their relation to frequency, bandwidth, magnetic bias field, insertion loss, isolation, etc. In the main the prediction of isolation is greater than a certain value and often taken as 20 dB below the input signal. However in general not much attention has been paid to the detailed nature of the r.f. signal emerging from the isolated port.

FIG. 1 of the drawings illustrates the phase distribution of the electric field across the circulator disc and is derived from the article by Bosma, referred to above. This field distribution is assumed to be 0° for the input port IP and it does not vary across the input stripline IS. The phase of the output at the output port OP is 180° with respect to the input and again does not vary across the output stripline OS. For the isolated port DP there is a large variation of the phase across the stripline DS and in the region of the junction of the stripline and the centre disc CD the E field is not a simple stripline mode but is distorted and there is a rapid phase variation of up to 180° across the width of the line between the two points P. For some distance along the stripline the phase difference and E field distortion across the line will persist but will decrease with distance along the line.

The object of the present invention is to provide a device including a three-port circulator suitable for Doppler radar equipment and of the kind referred to above, which incorporates signal-detection means arranged to indicate the direction sense of the moving target.

In this specification "Doppler Frequency" means the frequency difference between the reference, that is to say the transmitted, energy and the received echo.

According to the present invention therefore there is provided a device for a Doppler radar equipment comprising a circulator having an input port into which transmitter signal power can be fed, an antenna port connectible to an antenna to supply transmitter power to the antenna and to receive echo signals derived from the antenna by reflection of transmitted power from a target, and a detector port for connecting to a detector system the echo signal transferred from the antenna port and also a small portion of the transmitter power transferred from the input port, characterised in that two diode detector systems are connected one to each of two points transversely spaced across a transmission line connected to the detector port to provide two Doppler-frequency outputs of different relative phase.

Suitably, the circulator is in the form of a microstrip pattern on a substrate of gyromagnetic material.

Where the circulator is in microstrip form it is convenient if the diode detector and the usual low-pass filter arrangement necessary for such Doppler radar devices can be combined on the same substrate as that which supports the circulator pattern and to this end one embodiment of the invention is characterised in that each diode detector system comprises a diode connected between the detector port and one end of a section of open circuited microstrip a quarter-wavelength long at the transmitted frequency, and means for extracting the Doppler-frequency from the other end of the microstrip section.

In a further embodiment of the invention the diodes are connected to points spaced different distances along the transmission line leading from the circulator port: with such arrangement of diodes the impedance-matching between the port and the two diodes is different and some improvement in sensitivity can be achieved.

Figure 3:
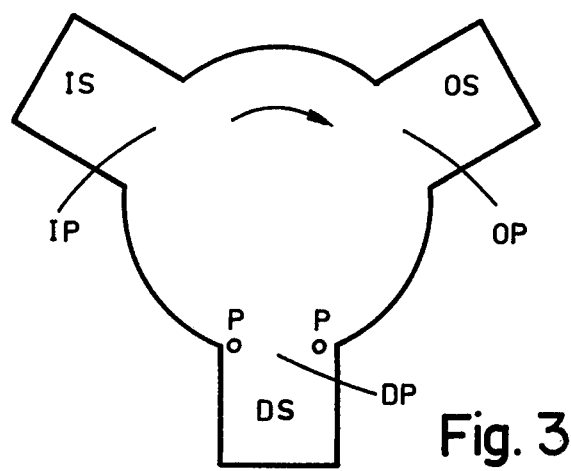
Figure 4:
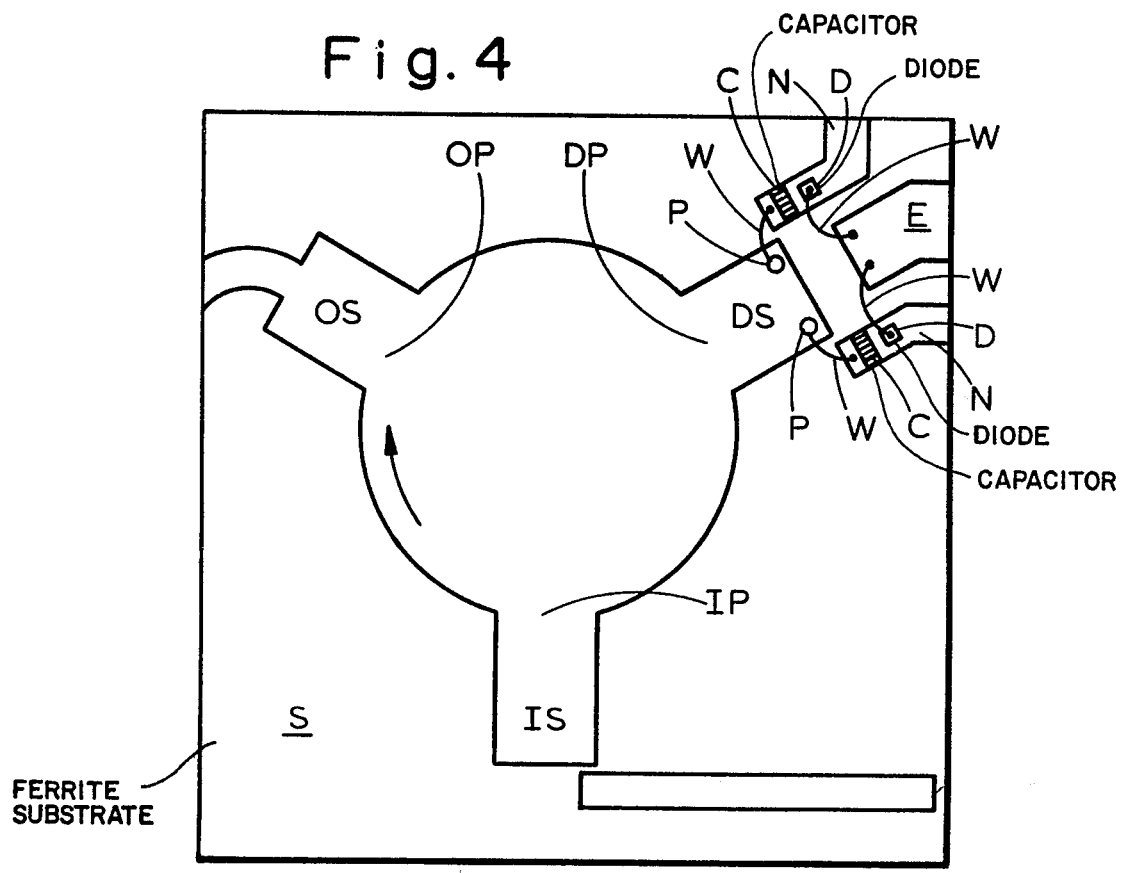
Figure 5:
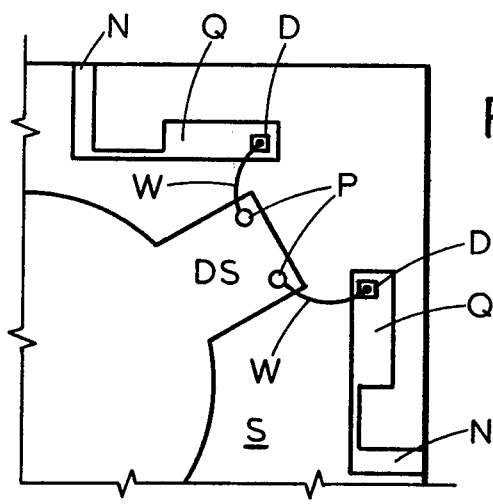

Embodiments of the invention will now be described with reference to the drawings in which, FIG. 1 illustrates the phase distribution of the electric field across a circulator, FIG. 2 illustrates the principle of direction sensing, FIG. 3 illustrates the principle of the invention, FIG. 4 illustrates an embodiment of the invention, FIG. 5 illustrates a second embodiment of the invention, and FIG. 6 shows a portion of the embodiments of the invention shown in FIGS. 4 and 5 illustrating the diode spacing.

For direction sensing in a Doppler radar it is necessary to provide two detectors and arrange for the detectors to be fed by the reference signal and echo signal in an appropriate phasing. This is indicated in FIG. 2 in which two detector diodes D and associated capacitors C are suitably positioned in a transmission line. In FIG. 2(a) two detectors are spaced a quarter wavelength apart relative to the incident echo signal SE but are fed in phase as far as the reference signal SR from the transmitter is concerned. The outputs of the two detectors for a constant-velocity target include two low-frequency Doppler signals SD of different phase, one signal either leading or lagging the signal derived from the other diode by 90°. This 90° phase lead or lag relationship between the two signals is a direct consequence of the "approach" or "recede" target direction relative to the aerial and is used as the direction sense indicator. In theory any lead or lag between 0° and 180° could be used for direction sensing but in practice it usually is most convenient to keep to about 90°.

FIG. 2(b) is similar except that the reference signal SR from the transmitter is applied with 90° phase difference to the two detectors and the echo signal SE is applied in phase. In FIG. 2(c) the two diodes are spaced 45° apart for both the reference and the echo signals which are applied to respective opposite ends of the transmission line. This combination also has the effect of producing Doppler output signals which are ±90° apart in phase depending on the direction of motion of the target.

Let us now consider the impact of the phenomena briefly described with reference to FIG. 1 in a Doppler radar system such as that referred to in the above-mentioned Specification. The maximum phase shift across the isolated port, which for obvious reasons it now becomes more appropriate to refer to as the detector port, of the input signal is 180° and if two detector diodes are placed at the positions P in FIG. 3 and power is fed into the input port IP the signals at the diodes will be spaced up to 180° apart in phase relative to each other. However, an echo signal applied from the aerial to the port OP, which it now is appropriate to refer to as the aerial port, is not subjected to any phase shift across the width of the detector port DP. Thus, each diode will receive a signal from the aerial in phase with the signal received by the other diode but will receive power from the input port at a phase difference of up to 180° relative to the other port. The similarity with FIG. 2(b) is obvious.

Referring now to FIG. 4 a three-port microstrip circulator in the form of a metallic pattern upon a 1 cm square gyromagnetic ferrite substrate S comprised input, aerial and detector ports IP, OP and DP having microstrip connecting lines IS, OS and DS, respectively, each 1.5 mm wide, that is to say approximately 15% less than a quarter-wavelength, and approximately a quarter-wavelength long. At the free end of the microstrip line were two interdigital capacitors C and one terminal of each capacitor was connected by a wire W to a corner of the line DS. The other terminal of each capacitor was extended to form a circuit portion N which also acted as an access terminal to the circuit. A diode D was mounted on each portion N with a respective diode D and each diode was connected to the ground plane, not shown, through a circuit portion E and a further wire W so that each capacitor and diode pair was connected in series between the detector port and the ground plane. In operation, detected signals, each including a Doppler-frequency component, appearing at the capacitor-diode junctions were thus led to terminals N. These Doppler-frequency components were then fed through respective low-pass filters and amplifiers in the usual manner to a phase-determining system for direction sense indication and one component was also fed to a frequency-determining system for speed indication. The operating frequency was 10.69 GHz. In place of interdigital capacitors C capacitor chips, or overlay capacitors on the end of the line DS can be used.

In another embodiment illustrated in FIG. 5 each detector diode was mounted on a corner of a respective open-circuit quarter-wavelength of microstrip line Q so as to simulate a short circuit at the diode and each was connected to a point P by a wire W: the detector output was obtained through the low pass filter thus formed with output connections at N. The circulator was of the same dimensions as that described with reference to FIG. 4 as was also the operating frequency. The lines Q were each 0.8 mm wide and 1.8 mm long; the diodes were connected to points P, at the end of the line DS, which were spaced approximately 0.2 mm from the edges of the line, the Doppler-frequency components again appearing at terminals N.

In experiments the positions of the points P at which the leads from the detector diodes were bonded were chosen to achieve the best r.f. match to the diode as well as to approach 90° Doppler signal phasing for direction-sensing indication. It was found that with the bonding points at opposite corners of the end of the quarter wave microstrip line DS the spacing was too large in the embodiment of FIG. 5 and caused a phase separation was about 145°: to achieve a 90° separation the positions required were found to be those spaced between about one-sixth and one-tenth of the way across the line from the outer edge as illustrated by the spacings "x" in FIG. 6. Such spacing is, of course equally applicable to the arrangement of FIG. 4. Once a bonding position had been chosen for a particular frequency it was found to be reproducible in modules of the same dimensions and layout.

Although the experimental devices were, for ease, constructed in microstrip by adapting currently-available modules of the kind referred to and shown in FIG. 1 of British Pat. No. 22477/74, corresponding to U.S. Pat. No. 4,034,313, the invention is also applicable to stripline construction, as indeed is evidenced by the fact that the original analysis by Bosma was of a stripline device.

Similarly, since the basic principles apply also to waveguide circulators, the invention is also applicable to such circulators.

Because, as stated earlier, the E field variation across the line DS decreases along the line in a direction away from the central disc CD it will be understood that the points P need not be opposite each other at different sides of the line DS but may occupy positions which are different distances along the line. With such "staggering" of the points P the radio frequency impedance-matching between the port DP and the two diodes is different, and some improvement in sensitivity can be achieved.

What we claim is:

1. A signal detection device for a Doppler radar system or the like comprising a circulator having an input port for receiving a signal to be transmitted toward a target, an antenna port for supplying to an antenna of the radar the signal to be transmitted and for receiving an echo signal reflected from the target, a detector port for supplying a signal comprising the echo signal and a small portion of the signal to be transmitted transferred thereto from said input port, said portion of said signal to be transmitted at said detector port having a phase which varies transversely of said detector port, said detection device further including a first and second detector means each connected to a respective one of two points spaced transversely across said detector port for producing, from said echo signal and said portion of said signal to be transmitted, two output signals of different phase and a frequency indicative of the velocity of the target relative to the radar system, the phase difference between said output signals being indicative of approach or recession of the target with respect to the radar system.

2. The detection device according to claim 1 wherein said circulator is in the form of a microstrip pattern on a substrate of gyromagnetic material.

3. The detection device according to claim 1 or 2 wherein each of said first and second detector means includes a capacitor and a diode connected in series between the respective one of said two points and a point of common potential.

4. The detection device according to claim 1 or 2 wherein each of said detector means includes a quarter-wavelength long, open circuited microstrip section and a diode connected between one end of said microstrip section and a respective one of said two points.

5. The detection device according to claim 1 including a transmission line connected to said detector port, said two points being spaced at different distances along said transmission line.

* * * * *